(12) United States Patent
Nakagawa

(10) Patent No.: US 9,525,874 B2
(45) Date of Patent: *Dec. 20, 2016

(54) TRANSMITTING APPARATUS AND TRANSMISSION METHOD

(71) Applicant: CANON KABUSHIKI KAISHA, Tokyo (JP)

(72) Inventor: Toshiyuki Nakagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/101,849

(22) Filed: Dec. 10, 2013

(65) Prior Publication Data

US 2014/0098884 A1 Apr. 10, 2014

Related U.S. Application Data

(63) Continuation of application No. 12/558,885, filed on Sep. 14, 2009, now Pat. No. 8,630,178.

(30) Foreign Application Priority Data

Sep. 17, 2008 (JP) ................................. 2008-237893

(51) Int. Cl.

| H04L 12/26 | (2006.01) |
| H04N 19/51 | (2014.01) |
| H04N 21/438 | (2011.01) |
| H04N 21/6375 | (2011.01) |
| H04N 21/6377 | (2011.01) |
| H04N 21/6437 | (2011.01) |
| H04N 21/658 | (2011.01) |
| H04N 19/513 | (2014.01) |

(Continued)

(52) U.S. Cl.
CPC ...... *H04N 19/00684* (2013.01); *H04N 19/107* (2014.11); *H04N 19/164* (2014.11); *H04N 19/513* (2014.11); *H04N 19/68* (2014.11); *H04N 19/89* (2014.11); *H04N 21/438* (2013.01); *H04N 21/6375* (2013.01); *H04N 21/6377* (2013.01); *H04N 21/6437* (2013.01); *H04N 21/658* (2013.01)

(58) Field of Classification Search
USPC .................................. 370/229–253, 277–282
See application file for complete search history.

(56) References Cited

U.S. PATENT DOCUMENTS

2002/0004838 A1* 1/2002 Hakenberg et al. .......... 709/231
2002/0191594 A1* 12/2002 Itoh et al. ..................... 370/352
(Continued)

*Primary Examiner* — Kwang B Yao
*Assistant Examiner* — Juvena Loo
(74) *Attorney, Agent, or Firm* — Canon USA, Inc. I.P. Division

(57) ABSTRACT

If a loss of a RTP packet is detected, a RTT acquisition unit acquires time information corresponding to a period of time needed from transmission of data from a transmitting apparatus to reception of this data at a receiving apparatus. A QoS switching unit determines based on the time information whether moving image data is to be retransmitted that was transmitted from the transmitting apparatus but that has been lost without being received by the receiving apparatus or moving image data located in playback time sequence after the lost moving image data is to be encoded without referring to the lost moving image data and the resultant encoded moving image data is to be transmitted.

11 Claims, 6 Drawing Sheets

(51) Int. Cl.
*H04N 19/107* (2014.01)
*H04N 19/164* (2014.01)
*H04N 19/89* (2014.01)
*H04N 19/68* (2014.01)

(56) References Cited

U.S. PATENT DOCUMENTS

2003/0009717 A1* 1/2003 Fukushima et al. .......... 714/748
2005/0050424 A1* 3/2005 Matsuura ...................... 714/748
2006/0015799 A1* 1/2006 Sung ...................... H04N 19/61
                                                  714/795
2006/0215586 A1* 9/2006 Hiddink et al. ............... 370/282
2006/0256785 A1* 11/2006 Nagai et al. .................. 370/389
2008/0316362 A1* 12/2008 Qiu et al. ...................... 348/607

* cited by examiner

TRANSMITTING APPARATUS AND TRANSMISSION METHOD

CROSS REFERENCE TO RELATED APPLICATIONS

The present application is a continuation of U.S. patent application Ser. No. 12/558,885, filed on Sep. 14, 2009, the content of which is expressly incorporated by reference herein in its entirety. This application also claims the benefit of Japanese Patent Application No. 2008-237893 filed Sep. 17, 2008, which is hereby incorporated by reference herein in its entirety.

BACKGROUND OF THE INVENTION

Field of the Invention

The present invention relates to an apparatus and method for transmitting moving image data.

Description of the Related Art

In recent years, a great improvement has been achieved in performance associated with communication environments and data processing environments. This has made it possible to realize a streaming technique to provide a real-time distribution of multimedia data such as moving image data or audio data via a network. The realization of the streaming technique allows users to enjoy viewing live TV programs or recorded video/TV programs supplied in a streaming format. Users are also allowed to view on-demand TV/video programs provided by the streaming technique.

In service such as real-time distribution of an audio or video program, a video telephone, etc., in which a transmission delay or a transmission failure is not allowed, a QoS (Quality of Service) control technique is very important to guarantee performance in terms of a communication speed, a delay time, jitter, a packet loss rate, etc.

For example, TCP (Transmission Control Protocol) provides a retransmission control scheme that detects an occurrence of a failure to receive data at a receiving end and retransmits the data to the receiving end.

It is known to use an intra refresh scheme to avoid error propagation. For example, in a technique disclosed in Japanese Patent Laid-Open No. 06-237451, if a packet is lost during transmission of moving image data, a refresh request is sent from a receiving end to a transmitting end. Upon receiving the refresh request, intraframe encoded moving image data is immediately transmitted from the transmitting end. This makes it possible to obtain a normal image at the receiving end even when a loss of a packet occurs.

However, depending on the status of a network, there is a possibility that retransmission of lost moving image data fails to avoid degradation in image quality. Besides, retransmission of lost moving image data results in an increase in transmission.

When moving image data lost somewhere in a transmission path is retransmitted, if the network is in a congested state, there is a possibility that the retransmitted moving image data does not arrive in time for playback (decoding). In this case, moving image data that is not used in playback is retransmitted, and thus a useless increase in transmission occurs.

When a loss of moving image data in a transmission path is detected, performing of intra refresh prevents error propagation. However, the intra refresh does not prevent an occurrence of degradation in image quality at a frame itself corresponding to the lost moving image data.

SUMMARY OF THE INVENTION

In view of the above, the present invention provides a technique to efficiently use a communication band and minimize degradation in image quality due to a loss of transmitted moving image data.

According to an aspect of the present invention, there is provided a transmitting apparatus configured to transmit moving image data to a receiving apparatus, comprising an acquisition unit configured to acquire time information corresponding to a period of time needed from transmission of data from the transmitting apparatus to reception of this data at the receiving apparatus, and a determination unit configured to determine based on the time information whether moving image data is to be retransmitted that was transmitted from the transmitting apparatus but that has been lost without being received by the receiving apparatus or moving image data located in playback time sequence after the lost moving image data is to be encoded without referring to the lost moving image data and the resultant encoded moving image data is to be transmitted.

Further features of the present invention will become apparent from the following description of exemplary embodiments with reference to the attached drawings.

DESCRIPTION OF THE EMBODIMENTS

The present invention is described in further detail below with reference to embodiments in conjunction with the accompanying drawings.

Figure 1:
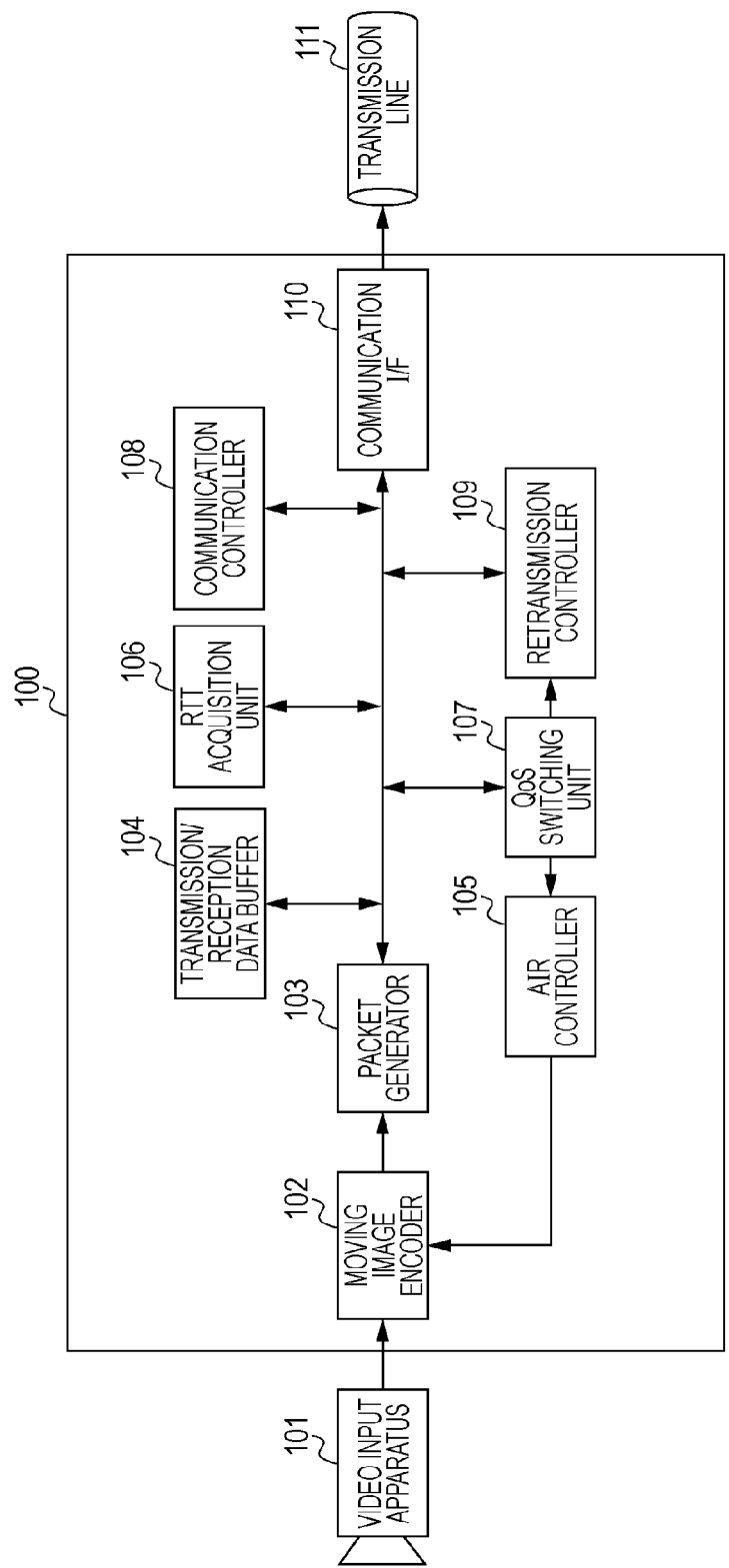
FIG. 1 is a block diagram illustrating an example of a configuration of a transmitting apparatus.

FIG. 1 is a block diagram illustrating an example of a functional configuration of a transmitting apparatus according to an embodiment of the present invention.

As shown in FIG. 1, the transmitting apparatus 100 according to the present embodiment includes a moving image encoder 102, a packet generator 103, a transmission/reception data buffer 104, an AIR controller 105 a RTT acquisition unit 106, and a QoS switching unit 107. The transmitting apparatus 100 further includes a communication controller 108, a retransmission controller 109, and a communication interface 110. The transmission/reception data buffer 104 is controlled by a storage control unit (not shown) to store data to be transmitted to receiving apparatus or data received from the receiving apparatus. The transmitting apparatus 100 is an apparatus configured to sequentially transmit intraframe encoded moving image data and interframe encoded moving image data to the receiving apparatus. The transmitting apparatus 100 is connected to a video input apparatus 101 configured to input video data and is also connected to a transmission line 111.

The video input apparatus 101 is an apparatus such as a video camera, a Web camera, etc., for inputting image data. The video input apparatus 101 may be configured to be integrated with the transmitting apparatus 100.

More specifically, the transmitting apparatus 100 may be a personal computer, a workstation, a notebook PC, various kinds of home appliances having a build-in computer, a game machine, a portable telephone, a digital video camera, a digital camera, or a combination of the above.

The transmission line 111 is a transmission line or a network for transmitting moving image data and other data in the form of packets.

Received data and data to be transmitted are temporarily stored in the transmission/reception data buffer 104. A communication path and a protocol used to transmit moving image data are controlled by the communication controller 108.

The moving image encoder 102 performs MPEG-4 compression-encoding on moving image data input from the video input apparatus 101. The resultant compression-encoded moving image data is supplied in units of frames from the moving image encoder 102 to the packet generator 103.

The packet generator 103 converts the moving image data supplied from the moving image encoder 102 into packets and stores them in the transmission/reception data buffer 104. In the present embodiment, the MPEG-4 Video algorithm is used in encoding of moving image data, and RTP (Real-time Transport Protocol) is used in transmission of encoded moving image data. In other words, the packet generator 103 converts the encoded moving image data into packets in a format according to RFC3550 prescribing the RTP payload format for encoded moving image data.

The communication controller 108 transmits RTP packets (moving image data) stored in the transmission/reception data buffer 104 to a specified address (receiving apparatus) via the communication interface 110.

The AIR controller 105 controls an AIR (Adaptive Intra Refresh) process in accordance with a command issued by the QoS switching unit 107. The intra refresh is a process to control encoding such that when a loss of a RTP packet (a loss of moving image data) occurs in a communication path, encoding is forced to switch into intraframe encoding. The AIR is a scheme to adaptively control encoding when a loss of a RTP packet occurs such that if there is moving image data encoded referring to the lost RTP packet, a moving image area of the moving image data is forcibly subjected to the intraframe encoding. In the AIR scheme, when a loss of a RTP packet in a still image area occurs, encoding may be performed by referring to, for example, a frame preceding the frame corresponding to the lost RTP packet. In general, intraframe encoded data has a greater data size than interframe encoded data. In the AIR scheme, because only moving image areas are forcibly subjected to the intraframe encoding, the total data size of resultant moving image data is smaller than in a case where the entire area is forcibly subjected to the intraframe encoding.

Alternatively, the intra refresh may be performed such that a frame referring to a lost RTP packet may be forced to be intraframe encoded over its entire area. The error information (loss information) is information sent to the transmitting apparatus 100 to inform that an RTP packet (moving image data) actually transmitted by the transmitting apparatus 100 cannot be received by the receiving apparatus. As for the error information, a retransmission request using a receiver report (RR) of RTCP may be employed. That is, the AIR controller 105 controls the encoding such that when an RTP packet is lost, following RTP packets are encoded without referring to data of the lost RTP packet.

If error information is received from the receiving apparatus, the RTT acquisition unit 106 acquires a RTT (Round Trip Time) value. In the present embodiment, the RTT refers to a period of time from the detection of a loss of moving image data at the receiving apparatus to the reception of a retransmitted packet at the receiving apparatus. That is, the RTT is equal to the sum of a round-trip time needed for a packet to make a round trip between the transmitting apparatus 100 and the receiving apparatus, a processing time at the receiving apparatus (receiving-side processing time), and a processing time at the transmitting apparatus 100 (transmitting-side processing time). The receiving-side processing time is a period of time spent by the receiving apparatus from the detection of a loss of a packet to the transmission of error information. The transmitting-side processing time is a period of time spent by the transmitting apparatus 100 from the reception of the error information to the retransmission of the lost packet or the transmission of a produced packet.

The details of the RTT acquisition process performed by the RTT acquisition unit 106 will be described later.

The QoS switching unit 107 switches the QoS control operation for handling an error depending on the RTT acquired by the RTT acquisition unit 106. More specifically, the QoS switching unit 107 determines based on the RTT value whether a RTP packet (lost moving image data) that was not received by the receiving apparatus is to be retransmitted or the AIR process is to be performed to prevent propagation of the error. If it is determined that the lost packet is to be retransmitted, the QoS switching unit 107 notifies the retransmission controller 109 of the determination. In the case where it is determined that the AIR process is to be performed, the QoS switching unit 107 notifies the AIR controller 105 of the determination. The details of the process performed by the QoS switching unit 107 will be described later.

The retransmission controller 109 retransmits the lost RTP packet (lost moving image data) in accordance with the notification from the QoS switching unit 107. The details of the retransmission process performed by the retransmission controller 109 will be described later.

Figure 2:
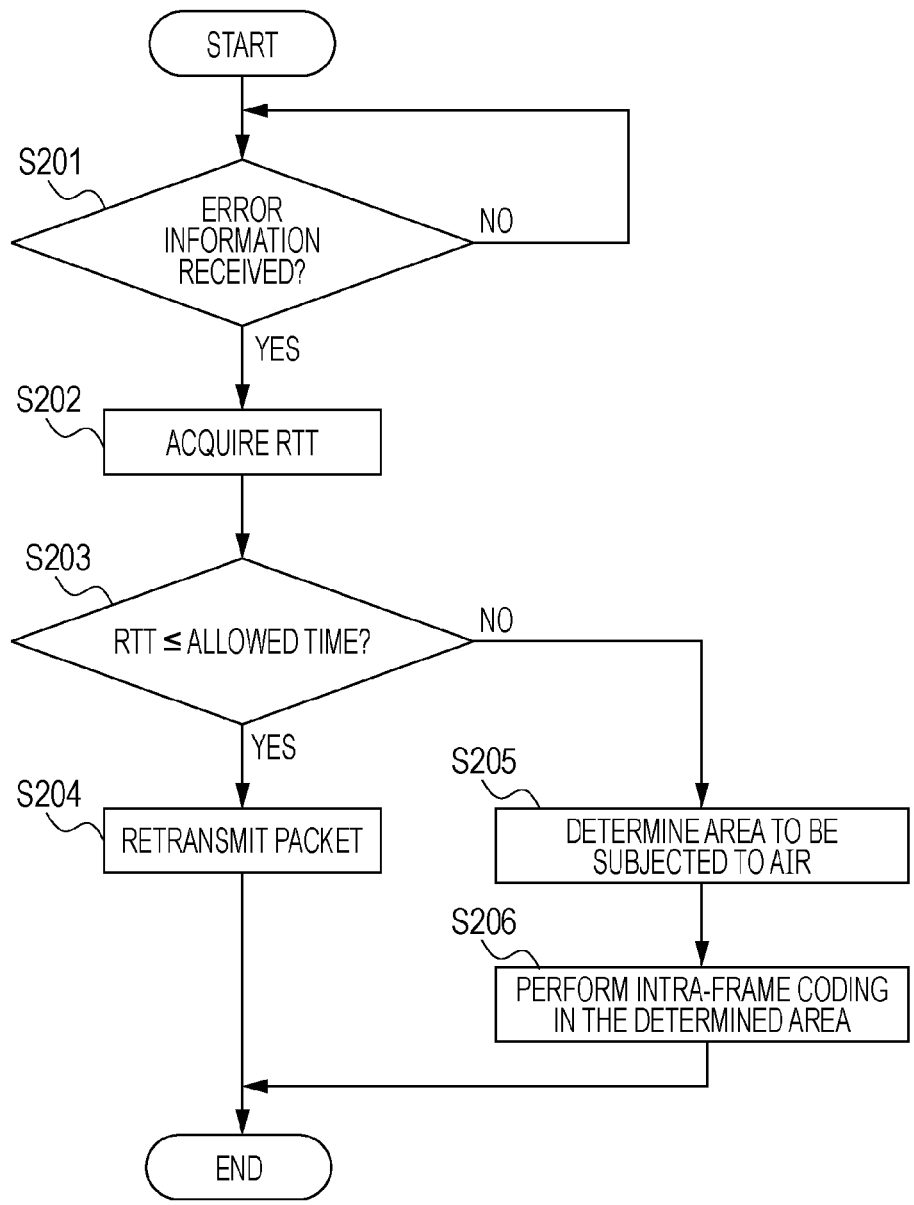
FIG. 2 is a flow chart illustrating an example of a QoS switching process performed by a transmitting apparatus.

The details of the QoS switching process by the transmitting apparatus 100 according to the present embodiment are now described below with reference to FIG. 2. FIG. 2 is a flow chart illustrating an example of a QoS switching process performed by the transmitting apparatus 100 according to the present embodiment. The transmitting apparatus 100 is configured to sequentially transmit intraframe encoded moving image data and interframe encoded moving image data to the receiving apparatus.

First, in the transmitting apparatus 100, the communication controller 108 determines whether error information (loss information) has been received from the receiving apparatus (step S201). The error information is information issued by the receiving apparatus to notify of a loss of a RTP packet when the receiving apparatus detects such a packet loss. In the present embodiment, the error information includes a sequence number of the lost RTP packet, a time at which the loss of the RTP packet was detected, and a time at which the error information was transmitted by the receiving apparatus.

In step S201, the communication controller 108 receives the loss information (error information) indicating the occurrence of the loss of moving image data.

In the present embodiment, the receiving apparatus determines whether a packet loss has occurred, based on consistency in the sequence number described in a header of the received RTP packet (moving image data). More specifically, the receiving apparatus determines that no packet loss has occurred as long as the received RTP packets have consecutive sequence numbers without any skip. However, if a skip is detected in the sequence numbers, the receiving apparatus determines that a loss of a packet has occurred and sends error information to the transmitting apparatus 100. Note that in the present embodiment, although the receiving apparatus regards a loss of a packet as an error, duplicated packets or packets at wrong locations are not regarded as errors. When the receiving apparatus detects duplicated packets, the receiving apparatus discards one of them. When the receiving apparatus detects packets at wrong locations in sequence, the receiving apparatus puts them at correct locations. This prevents unnecessary transmission from being performed in response to an unnecessary retransmission request.

In the case where it is determined in step 201 that no error information (loss information) has been received, step S201 is repeated until error information is received. If it is determined in step S201 that error information has been received, the processing flow proceeds to step S202.

In step S202 (acquisition step), the RTT acquisition unit 106 acquires the RTT between the transmitting apparatus 100 and the receiving apparatus. In the present embodiment, as described above, the RTT refers to the period of time from the detection of the loss of the RTP packet (moving image data) at the receiving apparatus to the arrival of the retransmitted RTP packet at the receiving apparatus. That is, the RTT is given by the sum of the round-trip time needed for a packet to make a round trip over a network, the processing time at the transmitting apparatus 100 (transmitting-side processing time), and the processing time at the receiving apparatus (receiving-side processing time). In the present embodiment, the RTT acquisition unit 106 stores in advance information indicating the period of time (transmitting-side processing time) needed to perform a process, after the reception of error information, to analyze the error information and retransmit the lost packet or transmit a produced packet. The error information includes information indicating a time at which the error information was sent from the receiving apparatus, and information indicating a time at which a loss of a RTP packet was detected by the receiving apparatus. When the RTT acquisition unit 106 receives error information, RTT acquisition unit 106 detects a current time and calculates the time (upstream one-way travel time) elapsed from the transmission of the error information from the receiving apparatus to the reception of it by the transmitting apparatus. The RTT acquisition unit 106 acquires information indicating the time (receiving-side processing time) needed for the receiving apparatus from the detection of the loss of the RTP packet to the transmission of the error information.

That is, in step S202, the RTT acquisition unit 106 acquires information indicating a first processing time (transmitting-side processing time) needed by the transmitting apparatus 100 from the reception of the error information (loss information) to the retransmission of the lost moving image data. The RTT acquisition unit 106 also acquires information indicating a second processing time (receiving-side processing time) needed by the receiving apparatus from the detection of the loss of moving image data to the transmission of the error information (loss information).

In the present embodiment, the RTT acquisition unit 106 also acquires, from the error information, the time (downstream one-way travel time) elapsed from the transmission of the RTP packet from the transmitting apparatus 100 to the reception of this RTP packet.

The RTT acquisition unit 106 calculates the sum of the upstream one-way travel time and the downstream one-way travel time thereby determining the round-trip time between the transmitting apparatus and the receiving apparatus. This acquisition scheme makes it possible to determine a high-accuracy round-trip time even for a case in which there is a difference in line transmission speed between transmission from the transmitting apparatus to the receiving apparatus and transmission from the receiving apparatus to the transmitting apparatus. Instead, the round-trip time may be calculated simply by doubling the upstream one-way travel time. In the present embodiment, the RTT acquisition unit 106 acquires the RTT by calculating the sum of the round-trip time calculated in the above-described manner, the transmitting-side processing time obtained in advance, and the receiving-side processing time described in the error information.

That is, in step S202, the RTT acquisition unit 106 acquires first time information (RTT) corresponding to the period of time (downstream one-way travel time) from the transmission of data from the transmitting apparatus 100 to the reception of this data at the receiving apparatus. After the RTT acquisition unit 106 acquires the RTT, the processing flow proceeds to step S203.

In step S203 (determination step), the QoS switching unit 107 compares the RTT acquired in step S202 with an allowed time.

In the present embodiment, the allowed time refers to a time difference between the time of detecting the loss of the RTP packet and the time of starting decoding of the lost RTP packet. The allowed time depends on the amount of moving image data stored in the transmission/reception data buffer of the receiving apparatus at a point of time at which the loss of the RTP packet is detected. The greater the number of RTP packets (the greater the amount of moving image data) stored in the transmission/reception data buffer at a point of time at which a loss of an RTP packet is detected, the greater the allowed time.

The receiving apparatus generally has a reception data buffer for absorbing jitters in packet arrival time on the network thereby controlling the amount of data in the reception data buffer so that a moving image is smoothly decoded and displayed.

In the present embodiment, the receiving apparatus produces the error information to be transmitted to the transmitting apparatus 100 such that the error information includes information indicating the allowed time corresponding to the amount of data of the RTP packets (moving image data) stored at the point of time at which the loss of the RTP packet was detected. The QoS switching unit 107 in the transmitting apparatus 100 acquires the information indicating the allowed time included in the error information.

When the RTT is shorter than the allowed time, the lost RTP packet (lost moving image data) is retransmitted to the receiving apparatus so that the retransmitted packet can be used in the playback. On the other hand, when the RTT is greater than the allowed time, even if the lost RTP packet is retransmitted, it will not arrive at the receiving apparatus by the time at which the RTP packet is needed, and thus the retransmitted data is not used in the playback. Besides, the retransmission of the RTP packet that will not be used in the playback leads to a useless increase in communication. In the present embodiment, to avoid the above problem, the transmitting apparatus 100 retransmits the lost RTP packet when the RTT is shorter than the allowed time. However, when the RTT is longer than the allowed time, the transmitting apparatus 100 does not retransmit the lost RTP packet but performs the AIR process to prevent an error arising from the loss of the RTP packet from propagating into RTP packets following the lost RTP packet.

In the case where it is determined in step S203 that the RTT is equal to or smaller than the allowed time, the QoS switching unit 107 issues a request to the retransmission controller 109 to retransmit the lost RTP packet (step S204). More specifically, when the retransmitted packet can arrive at the receiving apparatus by the time at which the packet is used in decoding (playback) of the moving image data, the QoS switching unit 107 issues the request to the retransmission controller 109 to retransmit the lost RTP packet. If the retransmission controller 109 receives the retransmission request, then in step S204, the retransmission controller 109 reads the lost RTP packet stored in the transmission/reception data buffer 104 and retransmits it to the receiving apparatus.

More specifically, if it is determined in step S203 that the time (RTT) indicated by the time information is shorter than the time (allowed time) corresponding to the time difference between the time of detecting the loss of the lost moving image data at the receiving apparatus and the decoding time at which decoding is to be performed for the lost moving image data, the QoS switching unit 107 determines that the lost moving image data should be retransmitted. Note that hereinafter the decoding time at which decoding is to be performed for the lost moving image data will also be referred simply as the decoding time for the lost moving image data.

On the other hand, if it is determined in step S203 that the RTT is greater than the allowed time, the QoS switching unit 107 issues a request to the AIR controller 105 to perform the AIR process. That is, when it is predicted that the retransmitted packet will not arrive at the receiving apparatus by the time at which the retransmitted packet is used in the playback (decoding) of the moving image data, the QoS switching unit 107 issues the request to the AIR controller 105 to perform the AIR process. As described above, the AIR process is a process to control the encoding such that the following frames are intraframe encoded without referring to the lost RTP packet (lost moving image data) thereby preventing the error arising from the loss of the RTP packet from propagating.

If the network gets congested due to an increase in traffic or the like, an increase generally occurs in the period of time (round-trip time) needed for packets to make a round trip between the transmitting apparatus 100 and the receiving apparatus, and accordingly the RTT increases. Thus, in the present embodiment, if congestion is detected, the QoS switching unit 107 switches the main operation from the retransmission to the AIR control. If the AIR controller 105 receives the AIR process request, the AIR controller 105 determines an area to be intraframe encoded and sends information indicating the determined area to the moving image encoder 102 (step S205).

In the above process, based on the error information received from the receiving apparatus, the AIR controller 105 is capable of correctly determining the area to be intraframe encoded. More specifically, the AIR controller 105 makes the correct determination in units of blocks (for example, in units of macroblocks or video packets) for each moving image frame so that the corresponding area in the lost RTP packet is not referred to in the interframe prediction encoding.

The moving image encoder 102 performs the intraframe encoding for the area specified by the AIR controller 105 thereby preventing the propagation of the error (step S206). As described above, when it is predicted that the retransmitted RTP packet will not arrive at the receiving apparatus by the time at which the retransmitted RTP packet is used in the playback (decoding), the retransmission of the lost RTP packet is not performed. This prevents a useless increase in communication due to the useless retransmission. Furthermore, it is possible to reduce the useless processing performed by the receiving apparatus to delete the retransmitted packet.

That is, in step S203, the QoS switching unit 107 determines based on the time information (RTT) whether to retransmit the moving image data that was actually transmitted from the transmitting apparatus 100 but that has not been received by the receiving apparatus or to perform the AIR process. In the AIR process, the encoding is controlled such that frames following the lost moving image data are encoded without referring to the lost moving image data.

Next, a total process of the system according to the present embodiment is described below with reference to FIG. 3.

Figure 3:
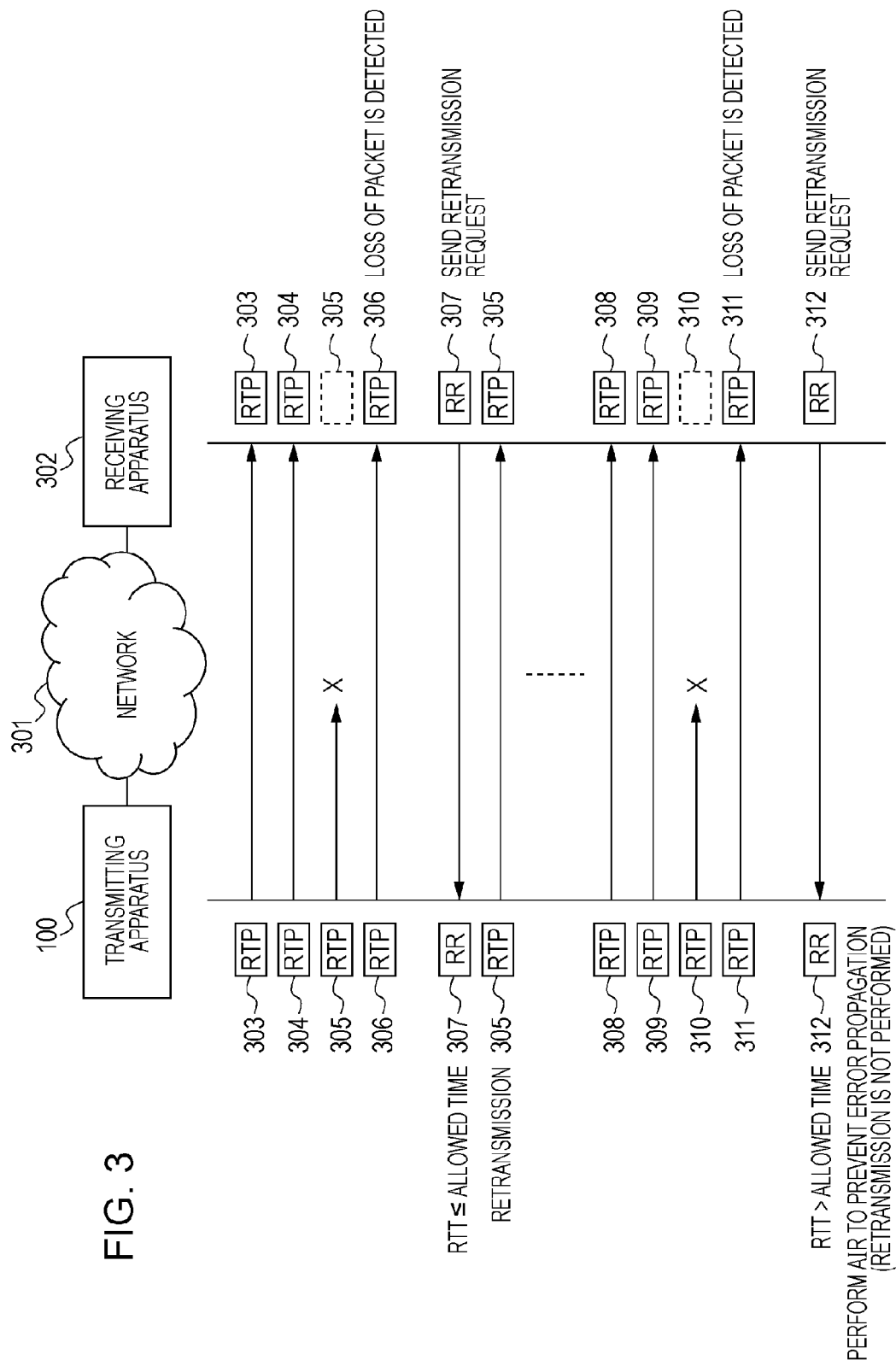
FIG. 3 is a sequence diagram illustrating an example of a QoS control process in a total system including a transmitting apparatus and a receiving apparatus.

FIG. 3 is a sequence diagram illustrating an example of a QoS control process in a total system including the transmitting apparatus and the receiving apparatus according to the present embodiment of the invention.

The transmitting apparatus 100 and the receiving apparatus 302 are connected to each other via the network 301. The transmitting apparatus 100 sequentially transmits RTP packets (303 to 306) of moving image data to the receiving apparatus 302.

If a RTP packet 305 is lost due to an error on the network 301, the lost RTP packet 305 is not received by the receiving apparatus 302 although RTP packets 303, 304, and 306 are received. If the receiving apparatus 302 detects a skip in the sequence number described in the RTP packet header, the receiving apparatus 302 determines that the RTP packet 305 has been lost. The receiving apparatus 302 transmits error information (RR 307) to the transmitting apparatus 100 thereby requesting the transmitting apparatus 100 to retransmit the RTP packet 305.

If the transmitting apparatus 100 receives the RR 307 from the receiving apparatus 302, the transmitting apparatus 100 acquires RTT described above. Let the network 301 be assumed to have no congestion at the time of the acquisition of the RTT and thus let the RTT be assumed to be equal to or less than the allowed time. That is, let us assume that if the RTP packet 305 is retransmitted, the retransmitted RTP packet 305 will arrive at the receiving apparatus 302 by the time at which the RTP packet 305 is used in the playback (decoding) of the moving image. In this case, the transmitting apparatus 100 retransmits the lost RTP packet 305 to the receiving apparatus 302 without performing the AIR control for preventing the propagation of the error. Using the retransmitted RTP packet 305, the receiving apparatus 302 can correctly decode and play back the moving image data.

The transmitting apparatus 100 then sequentially transmits RTP packets (308 to 311) of moving image data to the receiving apparatus 302.

If a RTP packet 310 is lost due to an error on the network 301, the lost RTP packet 310 is not received by the receiving apparatus 302 although RTP packets 308, 309, and 311 are received. If the receiving apparatus 302 detects a skip in the sequence number described in the RTP packet header, the receiving apparatus 302 determines that the RTP packet 310 has been lost. The receiving apparatus 302 transmits error information (RR 312) to the transmitting apparatus 100 to request the transmitting apparatus 100 to retransmit the RTP packet 310.

If the transmitting apparatus 100 receives the RR 312 from the receiving apparatus 302, the transmitting apparatus 100 acquires RTT. Let the network 301 be assumed to be in a congested state at the time of the acquisition of the RTT and thus let the RTT be assumed to be greater than the allowed time. That is, let us assume that even if the RTP packet 310 is retransmitted, the retransmitted RTP packet 310 will not arrive at the receiving apparatus 302 by the time at which the RTP packet 310 is used in the playback (decoding) of the moving image. In this case, the transmitting apparatus 100 does not retransmit the lost RTP packet 310 to the receiving apparatus 302 but the transmitting apparatus 100 performs the AIR control to prevent the propagation of the error. Thus, the receiving apparatus 302 does not have temporal propagation of a decoding error of the moving image data due to the loss of the RTP packet 310.

In the above explanation with reference to FIG. 3, it is assumed that a loss of one RTP packet occurs at a time. However, the communication controller 405 is capable of detecting a loss of a plurality of RTP packets in consecutive positions in transmission order. If a loss of a plurality of successive RTP packets is detected, the receiving apparatus acquires the time at which the loss was detected and acquires the decoding times corresponding to the respective lost RTP packets. As described above, the decoding time corresponding to each lost RTP packet depends on the amount of data of RTP packets stored in the transmission/reception data buffer of the receiving apparatus. The receiving apparatus transmits, to the transmitting apparatus, error information including information indicating the time at which the loss of RTP packets was detected, the decoding time corresponding to each RTP packet, the receiving-side processing time, and the one-way travel time (downstream one-way travel time) from the transmitting apparatus to the receiving apparatus as of when the loss of the RTP packets was deleted.

Upon receiving the error information, the RTT acquisition unit 106 in the transmitting apparatus 100 calculates the upstream one-way travel time from the time at which the error information was transmitted and the time at which the error information was received, and then calculates the round-trip time by adding the downstream one-way travel time to the upstream one-way travel time. The RTT acquisition unit 106 then adds the transmitting-side processing time and the receiving-side processing time to the round-trip time to determine the RTT. The QoS switching unit 107 compares the RTT determined by the RTT acquisition unit 106 with the allowed time, and determines depending on the comparison result whether the lost RTP packets is to be retransmitted or the AIR process is to be performed. Note that the lost RTP packets are different in decoding time and thus the allowed time is different for each lost RTP packet.

In the present embodiment, the QoS switching unit 107 makes the determination, as to whether to perform the retransmission or the AIR process, one by one for each of the lost successive RTP packets in order from the top to the tail in transmission sequence. If the QoS switching unit 107 determines that the retransmission should be performed for a RTP packet in a certain position in the transmission sequence, then the QoS switching unit 107 determines the retransmission should also be performed for following lost RTP packets. More specifically, for example, when the QoS switching unit 107 determines that a first lost RTP packet of moving image data in the set of successive lost RTP packets of moving image data should be retransmitted, the QoS switching unit 107 determines that a second lost RTP packet of moving image data immediately following the first lost packet should also be retransmitted. RTP packets at transmission sequence locations preceding the following RTP packets are to be decoded (played back) earlier than the following RTP packets. Therefore, if a certain retransmitted RTP packet can arrive at the receiving apparatus by the time at which this retransmitted RTP packet is used in the decoding (playback), RTP packets following this RTP packets can also arrive at the receiving apparatus by the times at which these RTP packets are used in the decoding (playback).

For example, when 9 successive RTP packets were lost, if it is determined that a lost RTP packet at the head in the transmission sequence order can arrive by the time at which it is needed, then it can be determined that the following 8 lost RTP packets can also arrive by the times at which they are needed. This allows a reduction in processing load imposed on the transmitting apparatus.

When a loss of a plurality of successive RTP packets occurs, the QoS switching unit 107 may determine whether the retransmission is to be performed or the AIR process is to be performed, in order from the tail to the head in the transmission sequence order. In this case, if it is determined that not the retransmission but the AIR process should be performed for a lost RTP packet at a particular location in the transmission sequence order, then it is determined that the AIR process should be performed without performing the retransmission for preceding lost RTP packets. More specifically, for example, when the QoS switching unit 107 determines that untransmitted moving image data is to be encoded without referring to a first lost RTP packet of moving image data in the set of successive lost RTP packets of moving image data and the resultant encoded moving image data is to be transmitted, the QoS switching unit 107 determines the process for the other lost RTP packets of moving image data as follows. That is, it is determined that a second lost RTP packet of moving image data preceding the first lost RTP packet is not used, and untransmitted moving image data is to be encoded without referring to the second lost RTP packet and the resultant encoded moving image data is to be transmitted.

RTP packets at transmission sequence locations following the preceding RTP packets are to be decoded (played back) later than the preceding RTP packets. Therefore, if a certain retransmitted RTP packet cannot arrive at the receiving apparatus by the time at which this retransmitted RTP packet is used in the decoding (playback), RTP packets preceding this RTP packet can also not arrive at the receiving apparatus by the times at which these RTP packets are used in the decoding (playback).

For example, when 9 successive RTP packets were lost, if a lost RTP packet at the tail of the sequence of these 9 successive RTP packets is transmitted, it cannot arrive by the decoding time corresponding to the lost RTP packet, then it can be determined that the following 8 lost RTP packets can also not arrive by the times at which they are needed even if they are retransmitted. This allows a reduction in processing load imposed on the transmitting apparatus.

When a loss of a plurality of RTP packets at consecutive locations in transmission sequence order is detected, the determination as to whether the retransmission is to be performed or the AIR process is to be performed may be made starting with a particular lost RTP packet depending on the amount of data stored in the transmission/reception data buffer described in the error information received from the receiving apparatus.

In the present embodiment, when a loss of a plurality of RTP packets at consecutive locations in transmission sequence order is detected, if the QoS switching unit 107 determines that retransmission is to be performed for part of the lost RTP packets, but the AIR process is to be performed for the remaining lost RTP packets, the QoS switching unit 107 performs the process as follows. That is, the RTP packets to be retransmitted are re-encoded so that the resultant re-encoded RTP packets are not based on any lost RTP packet that is not retransmitted.

That is, the QoS switching unit 107 determines that, as for lost RTP packets of moving image data determined to be retransmitted, re-encoding is to be performed without referring to any lost RTP packet that is not to be retransmitted.

For example, when a loss of 9 RTP packets at consecutive locations in transmission sequence order is detected, let us assume that the QoS switching unit 107 determines that 4 lost RTP packets at locations in the tail, in the transmission sequence order, of the set of 9 lost RTP packets are to be retransmitted, and the AIR process is to be performed for the remaining 5 lost RTP packets without performing retransmission. In this case, simple processing can lead to a possibility that some of the retransmitted RTP packets was encoded referring to some of 5 RTP packets that are not retransmitted, and this can cause a played-back image to have degradation even if the retransmitted packets are successfully received and decoded. In the present embodiment, to avoid the above problem, the QoS switching unit 107 determines that moving image data corresponding to the RTP packets to be retransmitted is re-encoded without referring to any data corresponding to the lost RTP packets that are not to be retransmitted. This makes it possible to reduce the degradation in the played-back image due to the loss of RTP packets. The AIR process may not be performed for the retransmitted RTP packets.

In the present embodiment, as described above, when the transmitting apparatus 100 receives error information (loss information) indicating an occurrence of a loss of an RTP packet from the receiving apparatus, the transmitting apparatus 100 switches the operation between a mode in which the lost RTP packet is retransmitted and a mode in which the AIR process is performed. The switching of the operation between the retransmission and the AIR process in the transmitting apparatus 100 is determined based on the status of the network as of the time of the reception of the error information and based on the amount of moving image data stored in the receiving apparatus. That is, if a lost packet can be retransmitted such that the packet can arrive at the receiving apparatus by a time at which the packet is needed in playing back (decoding) of a moving image, the retransmission is performed, but otherwise the AIR process is performed without performing the retransmission.

By performing the process in the above described manner, it becomes possible to prevent useless retransmission of RTP packets that would not arrive in time for the decoding (playback), and thus it becomes possible to prevent a useless increase in communication. Thus, it is possible to use efficiently a communication band while maintaining high moving image quality.

Furthermore, it is possible to prevent a useless operation of deleting a retransmitted packet whose arrival at the receiving apparatus is late for the decoding operation. When a lost RTP packet is retransmitted, the AIR process associated with the retransmitted packet is not performed. This allows a reduction in the processing load associated with the AIR process performed in the transmitting apparatus. The transmitting apparatus switches QoS depending on the RTT value relative to the allowed time. This makes it possible to achieve the advantages described above regardless of the capabilities of the receiving apparatus.

In the embodiment described above, RTT indicates the time elapsed from the detection of a loss of a RTP packet to the reception of the retransmitted RTP packet. In the embodiment described above, the allowed time is given by a period of time from the detection of a loss of a RTP packet to a time at which decoding is to be performed for the lost RTP packet. However, the RTT and the allowed time are not limited to the above, but they may be given in different ways.

For example, the RTT may be given by the sum of the downstream one-way travel time and the transmitting-side processing time. In this case, the allowed time is given by the difference between the time of reception of error information at the transmitting apparatus 100 and the time at which decoding is to be performed in the receiving apparatus for a packet corresponding to the lost RTP packet (lost moving image data) described in the error information.

That is, the error information produced by the receiving apparatus and transmitted therefrom includes a sequence number of a lost RTP packet, a downstream one-way travel time, and a decoding time corresponding to the lost RTP packet. Note that the decoding time refers to the time at which decoding is to be performed for a packet corresponding to the lost RTP packet. The downstream one-way travel time refers to a time elapsed from the transmission of data from the transmitting apparatus to the reception of the data at the receiving apparatus. The receiving apparatus can acquire the downstream one-way travel time, for example, as follows. That is, when a loss of a RTP packet is detected, the downstream one-way travel time can be calculated from the time at which the transmitting apparatus 100 transmitted a RTP packet that was received at the receiving apparatus when the loss of the RTP packet was detected and from the time at which the RTP packet was received at the receiving apparatus. The decoding time can be determined depending on the amount of moving image data stored in the transmission/reception data buffer in the receiving apparatus.

If the error information is received, the RTT acquisition unit 106 of the transmitting apparatus 100 determines the RTT by calculating the sum of the downstream one-way travel time and the transmitting-side processing time. The transmitting-side processing time is stored in advance in the transmitting apparatus 100.

That is, if the communication controller 108 receives the error information (loss information) indicating an occurrence of a loss of moving image data, the RTT acquisition unit 106 acquires the transmitting-side processing time. As described above, the transmitting-side processing time refers to the processing time spent by the transmitting apparatus 100 from the reception of the error information (loss information) to the retransmission of the lost moving image data. The RTT acquisition unit 106 determines the time information (RTT) by calculating the sum of the transmitting-side processing time and the time (downstream one-way travel time) from the transmission of the data from the transmitting apparatus 100 to the reception of this data at the receiving apparatus.

The QoS switching unit 107 acquires the allowed time (the time difference between the time of the reception of the error information and the decoding time for the lost RTP packet). If the RTT (the sum of the downstream one-way travel time and the transmitting-side processing time) is smaller than the allowed time, the QoS switching unit 107 determines that the retransmission is to be performed. However, if the RTT is greater than the allowed time, the QoS switching unit 107 determines that the AIR process is to be performed without performing the retransmission.

By switching the operation between the retransmission and the AIR process depending on the status of the network when an error occurs in the above-described manner, it is possible to achieve the advantages of the present invention.

The RTT may be given by the sum of the round-trip time and the transmitting-side processing time. In this case, the allowed time is given by the time difference between the time of transmission of error information from the receiving apparatus and the decoding time for the lost RTP packet corresponding to the error information.

That is, the error information produced by the receiving apparatus and transmitted therefrom includes the sequence number of the lost RTP packet, the time of transmission of the error information, the downstream one-way travel time, the decoding time corresponding to the lost RTP packet, and the time of detection of the lost RTP packet.

Upon receiving the error information, the RTT acquisition unit 106 of the transmitting apparatus 100 calculates the upstream one-way travel time from the time of reception of the error information and the time of transmission of the error information, and further determines the round-trip time by calculating the sum of the upstream one-way travel time and the downstream one-way travel time described in the error information. The RTT acquisition unit 106 then determines the RTT by calculating the sum of the obtained round-trip time and the transmitting-side processing time. The RTT acquisition unit 106 also acquires the allowed time (the time difference between the time of transmission of the error information and the decoding time for the lost RTP packet). If the RTT (equal to the sum of the round-trip time, the transmitting-side processing time, and the receiving-side processing time) is smaller than the allowed time, the QoS switching unit 107 determines that the retransmission is to be performed. However, if the RTT is greater than the allowed time, the QoS switching unit 107 issues a command to the AIR controller 105 to perform the AIR process without performing the retransmission.

That is, if the communication controller 108 receives error information (loss information) indicating the occurrence of the loss of moving image data, the RTT acquisition unit 106 acquires the transmitting-side processing time. As described above, the transmitting-side processing time is the processing time needed by the transmitting apparatus 100 from the reception of the error information (loss information) to the retransmission of the lost moving image data.

The RTT acquisition unit 106 determines the time information (RTT) by calculating the sum of the round-trip time (given by the sum of the upstream one-way travel time and the downstream one-way travel time) and the transmitting-side processing time. As described above, the upstream one-way travel time indicates the period of time from the transmission of the error information (loss information) from the receiving apparatus to the reception of this error information at the transmitting apparatus 100, while the downstream one-way travel time indicates the period of time elapsed from the transmission of data from the transmitting apparatus 100 to the reception of this data at the receiving apparatus.

If the RTT value is smaller than the allowed time given by the time difference between the time of the transmission of the error information from the receiving apparatus to the decoding time at which encoding corresponding to the lost moving image data is to be performed, the QoS switching unit 107 determines that the lost moving image data is to be retransmitted.

By switching the operation between the retransmission and the AIR process depending on the status of the network when an error occurs in the above-described manner, it is possible to achieve the advantages of the present invention.

Next, a second embodiment of the present invention is described below. The explanation will be focused on differences from the first embodiment.

In the first embodiment described above, the transmitting apparatus determines whether the retransmission is to be performed or the AIR process is to be performed. In the second embodiment, in contrast, based on the status of the network as of the time of detection of a loss of a RTP packet, the receiving apparatus determines whether the retransmission is to be performed or the AIR process is to be performed, and the receiving apparatus informs the transmitting apparatus of the determination.

Figure 4:
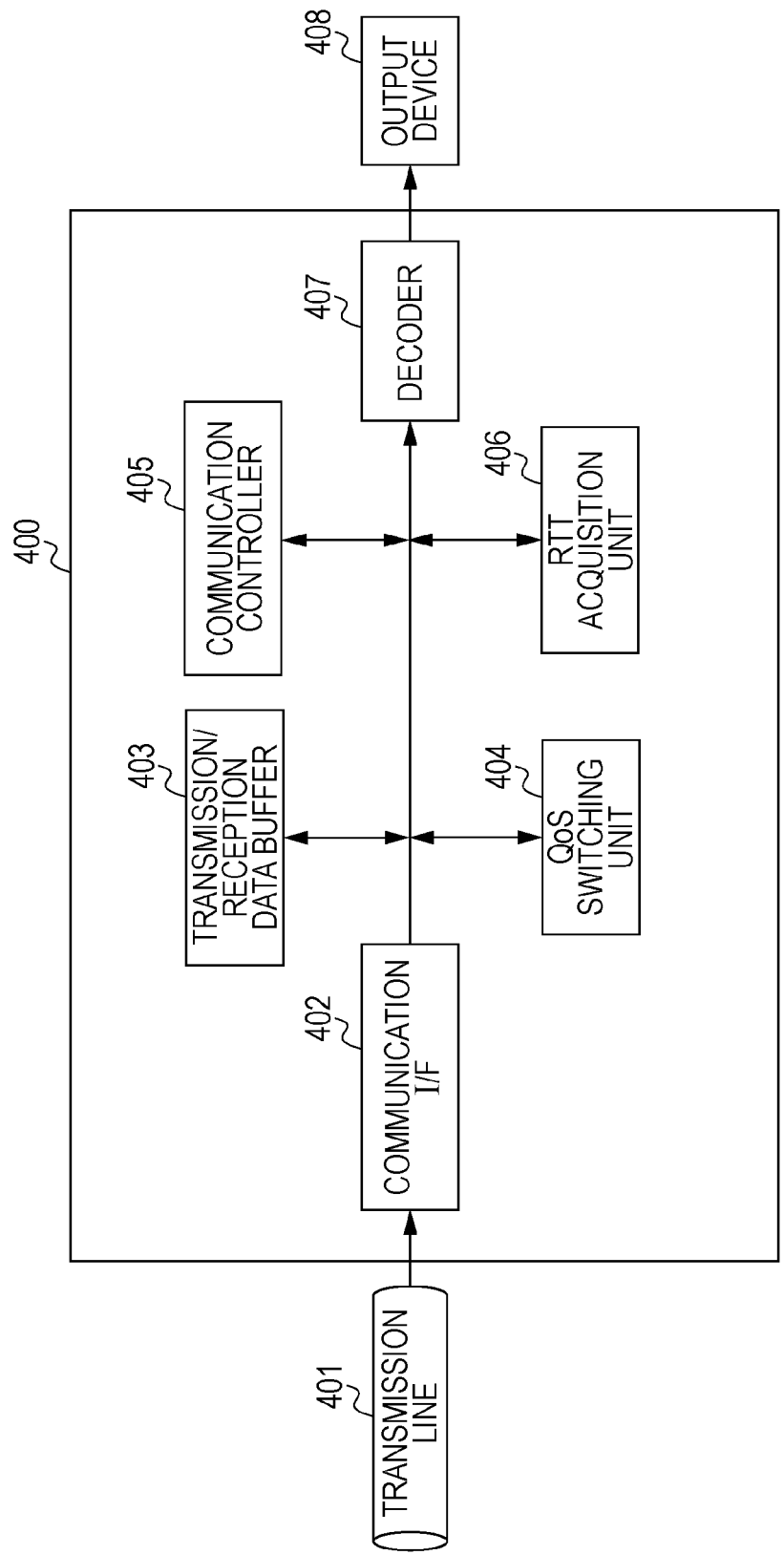
FIG. 4 is a block diagram illustrating an example of a configuration of a receiving apparatus.

FIG. 4 is a block diagram illustrating an example of a functional configuration of a receiving apparatus according to the present embodiment of the invention.

As shown in FIG. 4, the receiving apparatus 400 includes a communication interface 402, a transmission/reception data buffer 403, a QoS switching unit 404, a communication controller 405, a RTT acquisition unit 406, and a moving image decoder 407. The transmission/reception data buffer 403 is controlled by a storage control unit (not shown) to store data received from the transmitting apparatus or data to be transmitted to the transmitting apparatus. The receiving apparatus 400 is configured to receive intraframe encoded moving image data and interframe encoded moving image data sequentially transmitted from a transmitting apparatus. The receiving apparatus 400 is connected to an output device 408 and a transmission line 401.

The output device 408 is a device to output a video image such as a display, a storage apparatus, a transmitter to transmit image data to a network, etc. The receiving apparatus 400 may be configured to be integrated with the output device 408.

The receiving apparatus 400 may be a personal computer, a workstation, a notebook PC, various kinds of home appliances having a build-in computer, a game machine, a portable telephone, a digital video camera, a digital camera, or a combination of the above.

In FIG. 4, the transmission line 401 is a transmission line or a network for transmitting data (moving image data) in the form of packets such as RTP packets. Received data and data to be transmitted are temporarily stored in the transmission/reception data buffer 403, and a protocol used to receive moving image data is controlled by the communication controller 405.

The moving image decoder 407 is configured to perform MPEG-4 decoding on the moving image data received from the transmitting apparatus and stored in the transmission/reception data buffer. The moving image data decoded by the moving image decoder 407 is supplied to the output device 408 in proper units (generally, in units of frames) determined depending on the specifications of the output device 408.

As in the first embodiment, based on the consistency in sequence number described in the header of each received RTP packet, the communication controller 405 determines whether a loss of a packet has occurred. More specifically, if a skip or discontinuation is detected in sequence numbers of RTP packets, it is determined that a loss of a packet has occurred at the skip or the discontinuation. If the communication controller 405 detects a loss of a packet, the communication controller 405 notifies the RTT acquisition unit 406 of this fact.

Upon receiving the notification of the loss of the packet, the RTT acquisition unit 406 acquires the RTT. In the present embodiment, the RTT refers to a time elapsed from the detection of the loss of the packet by the receiving apparatus 400 to the arrival of the retransmitted packet. That is, the RTT indicates the sum of the time (round-trip time) needed for a packet to make a round trip between the transmitting apparatus and the receiving apparatus 400, the processing time at the receiving apparatus 400 (receiving-side processing time), and the processing time at the transmitting apparatus (transmitting-side processing time). The receiving-side processing time refers to a processing time spent by the receiving apparatus 400 from detection of a loss of a packet to transmission of error information, while the transmitting-side processing time refers to a processing time spent by the transmitting apparatus from reception of the error information to transmission of a generated packet or retransmission of the lost packet. In the present embodiment, as described above, the receiving apparatus 400 determines whether a request to retransmit a lost RTP packet is to be issued or a request to perform the AIR process is to be issued. Therefore, the content of the error information transmitted from the receiving apparatus 400 varies depending on whether the retransmission is requested or the AIR process is requested.

In the present embodiment, it is assumed that the RTT acquisition unit 406 has already acquired the information associated with the transmitting-side processing time from the transmitting apparatus before the communication of RTP packets (moving image data) is started. The RTT acquisition unit 406 acquires the time at which the loss of the RTP packet was detected.

The RTT acquisition unit 406 also acquires the downstream one-way travel time from the information associated with the packet transmission time described in a normal RTP packet received after the lost RTP packet. The downstream one-way travel time refers to a time elapsed from the transmission of data from the transmitting apparatus to the reception of this data at the receiving apparatus 400. The RTT acquisition unit 406 has already acquired the receiving-side processing time indicating the time needed from the detection of a loss of a RTP packet to the transmission of error information. In the present embodiment, the RTT acquisition unit 406 acquires the RTT value by adding the previously acquired transmitting-side processing time and receiving-side processing time to the round-trip time obtained by doubling the downstream one-way travel time. In a case where data is periodically transmitted to the transmitting apparatus, the RTT acquisition unit 406 can acquire an upstream one-way travel time needed for the data to travel from the receiving apparatus to the transmitting apparatus. In this case, the round-trip time may be obtained as the sum of the downstream one-way travel time and the upstream one-way travel time. This acquisition scheme makes it possible to determine a high-accuracy round-trip time even for a case in which there is a difference in line transmission speed between transmission from the transmitting apparatus to the receiving apparatus and transmission from the receiving apparatus to the transmitting apparatus.

The QoS switching unit 404 compares the RTT value acquired by the RTT acquisition unit 406 with the allowed time, and makes the determination according to the comparison result as to whether to issue a request to the transmitting apparatus to retransmit the lost RTP packet or to perform the AIR process. Note that the allowed time is given by the period of time from the detection of the loss of the RTP packet to the time at which the decoding corresponding to the lost RTP packet is to be performed. The details of the determination of QoS by the QoS switching unit 404 will be described later.

The QoS switching process performed in the receiving apparatus 400 according to the present embodiment is described below with reference to FIG. 5.

Figure 5:
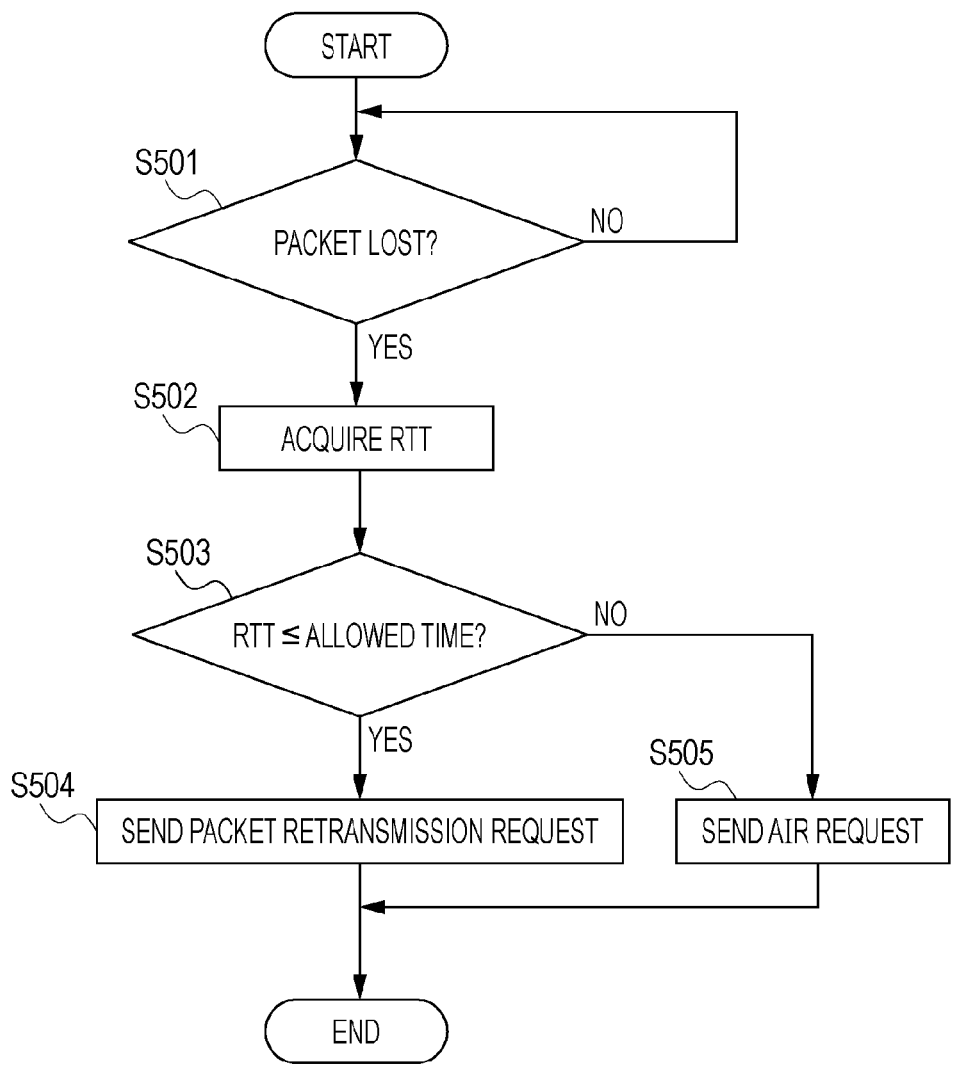
FIG. 5 is a flow chart illustrating an example of a QoS switching process performed by a receiving apparatus.

FIG. 5 is flow chart illustrating an example of a QoS switching process performed in the receiving apparatus 400 according to the present embodiment.

Note that the receiving apparatus 400 is configured to receive intraframe encoded moving image data and interframe encoded moving image data sequentially transmitted from the transmitting apparatus.

First, the communication controller 405 of the receiving apparatus 400 determines whether a loss of a packet has been detected (step S501). As in the first embodiment, if the communication controller 405 detects a skip or discontinuity in sequence number described in the header of each received RTP packet, the communication controller 405 determines that a loss of an RTP packet has occurred.

If no packet loss is detected in step S501, step S501 is repeated until a packet loss is detected. If a packet loss is detected in step S501, the processing flow proceeds to step S502.

In step S502 (acquisition step), the RTT acquisition unit 406 acquires RTT. In the present embodiment, as described above, the RTT is a period of time from the detection of a loss of a RTP packet by the communication controller 405 to the time at which the decoding is to be performed for this RTP packet. Note that the decoding time at which decoding is to be performed for the lost RPT packet is determined depending on the amount of data of RTP packets (moving image data) stored in the transmission/reception data buffer 403 as of the time of the detection of the loss of the RTP packet.

More specifically, in step S502, the RTT acquisition unit 406 acquires the time information (RTT) corresponding to the period of time (downstream one-way travel time) needed from the transmission of data from the transmitting apparatus to the reception of this data at the receiving apparatus 400. If the RTT acquisition unit 406 acquires the RTT value, the processing flow proceeds to step S503.

In step S503 (determination step), the QoS switching unit 404 determines whether the lost RTP packet can arrive in time if the retransmission is performed for the lost RTP packet. This determination is made based on the whether the RTT value acquired in step S502 is equal to or smaller than the time (allowed time) allowed till the decoding is performed in the receiving apparatus 400. More specifically, in the present embodiment, the allowed time is given by the period of time from the detection of the loss of the RTP packet to the time at which decoding is to be performed for the lost RTP packet. If the RTT is smaller than the allowed time, the QoS switching unit 404 determines that the retransmitted RTP packet will be in time for the playback (decoding). However, if the RTT is greater than the allowed time, the QoS switching unit 404 determines that the retransmitted RTP packet will not be in time for the playback (decoding). In the case where the QoS switching unit 404 determines that the retransmission of the lost RTP packet will be in time for the playback (decoding), the processing flow proceeds to step S504.

In step S504, the QoS switching unit 404 transmits, to the transmitting apparatus, a request for retransmission of the lost RTP packet.

In the case where the QoS switching unit 404 determines in step S503 that the retransmission of the lost RTP packet will not be in time for the playback (decoding), the processing flow proceeds to step S505. In step S505, the QoS switching unit 404 transmits, to the transmitting apparatus, a request for the AIR process.

That is, the QoS switching unit 404 makes the determination in step S503 based on the time information (RTT) as to whether a request is to be issued for retransmission of moving image data that has not arrived at the receiving apparatus 400 although it was transmitted from the transmitting apparatus, or a request to perform the AIR process is issued. As described above, the AIR process is a process of encoding moving image data following the lost moving image data such that the lost moving image data is not referred to in the encoding.

As described above, the QoS switching unit 404 in the receiving apparatus 400 compares the RTT with the allowed time and determines whether the retransmission of the RTP packet will be in time for the playback (decoding). When the QoS switching unit 404 determines that the retransmission of the RTP packet will not be in time for the playback (decoding), the QoS switching unit 404 transmits not the retransmission request but the AIR process request to the transmitting apparatus 601. On the other hand, when it is determined that the retransmission of the RTP packet will be in time for the playback (decoding), the QoS switching unit 404 transmits not the AIR process request but the retransmission request to the transmitting apparatus 601. Upon receiving the request from the receiving apparatus 400, the transmitting apparatus 601 performs the retransmission of the RTP packet of the AIR process according to the content of the request.

Next, a total process of the system according to the present embodiment is described below with reference to FIG. 6.

Figure 6:
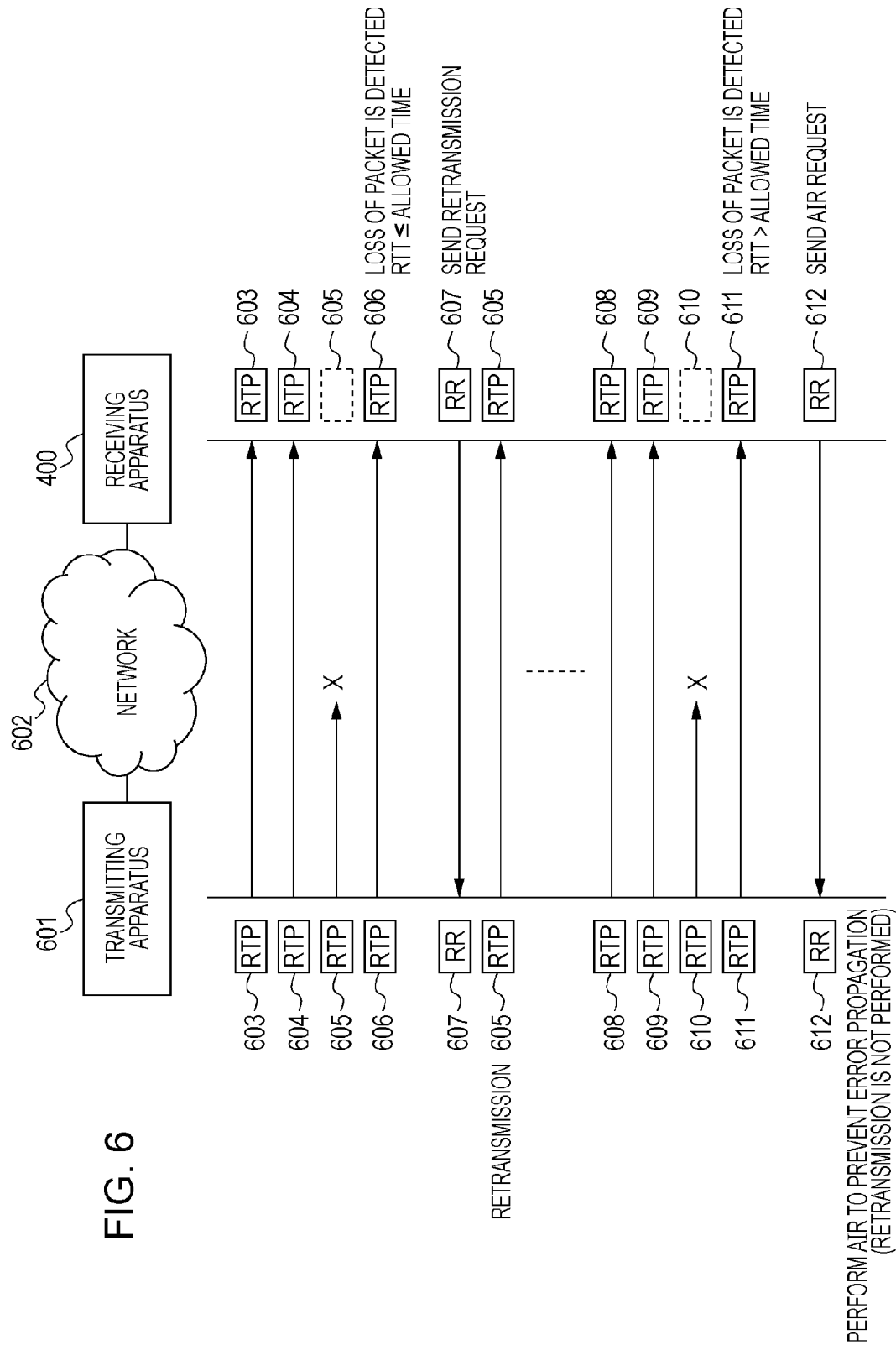
FIG. 6 is a sequence diagram illustrating an example of a QoS control process in a total system including a transmitting apparatus and a receiving apparatus.

FIG. 6 is a diagram illustrating an example of a process sequence associated with the QoS switching in the total system including the transmitting apparatus and the receiving apparatus according to the present embodiment.

The transmitting apparatus 601 and the receiving apparatus 400 are connected to each other via the network 602. The transmitting apparatus 601 sequentially transmits RTP packets (603 to 606) of moving image data to the receiving apparatus 400.

If a RTP packet 605 is lost due to an error on the network 602, the lost RTP packet 605 is not received by the receiving apparatus 400 although RTP packets 603, 604, and 606 are received. If the receiving apparatus 400 detects a skip in the sequence number described in the RTP packet header, the receiving apparatus 400 determines that the RTP packet 605 has been lost. If the receiving apparatus 400 detects the loss of the RTP packet 605, the receiving apparatus 400 acquires the RTT value. In the present embodiment, as described above, the RTT refers to the time from the detection of the loss of the RTP packet (moving image data) to the time at which the retransmitted RTP packet is received. That is, RTT is given by the sum of the round-trip time between the transmitting apparatus and the receiving apparatus, the transmitting-side processing time and the receiving-side processing time. Herein, let us assume that there is congestion on the network 602 as of the time of acquisition of the RTT value, and thus the RTT value is smaller than the allowed time. Note that in the present embodiment, the allowed time refers to the period of time from the detection of a loss of a RTP packet to the time at which the decoding is to be performed for this RTP packet. The time at which the decoding is to be performed for the RTP packet is determined depending on the amount of data of RTP packets (moving image data) stored in the transmission/reception data buffer as of the time at which the loss of the RTP packet is detected.

In this case, the QoS switching unit 404 of the receiving apparatus 400 determines that the retransmitted RTP packet will arrive at the receiving apparatus 400 in time for the decoding. Thus, the receiving apparatus 400 transmits RR 607 (error information) to the transmitting apparatus 601 thereby requesting the transmitting apparatus 601 to retransmit the RTP packet 605.

Upon receiving the RR 607 from the receiving apparatus 400, the transmitting apparatus 601 retransmits the lost RTP packet 605 to the receiving apparatus 400 without performing the AIR control for preventing the error propagation. Thus the retransmitted RTP packet 605 is received by the receiving apparatus 400 by the time the decoding is to be performed for the RTP packet 605, and thus the receiving apparatus 400 can correctly decode and play back the moving image data.

Thereafter, the transmitting apparatus 601 sequentially transmits RTP packets (608 to 611) of moving image data to the receiving apparatus 400.

If a RTP packet 610 is lost due to an error on the network 602, the lost RTP packet 610 is not received by the receiving apparatus 400 although RTP packets 608, 609, and 611 are received. If the receiving apparatus 400 detects a skip in the sequence number described in the RTP packet header, the receiving apparatus 400 determines that the RTP packet 610 has been lost. If the receiving apparatus 400 detects the loss of the RTP packet 610, the receiving apparatus 400 acquires the RTT value. Herein, let us assume that the network 602 has congestion as of the time of the acquisition of the RTT and thus the RTT is greater than the allowed time. In this case, the QoS switching unit 404 determines that the retransmitted RTP packet 610 will not arrive at the receiving apparatus 400 in time for the decoding for the RTP packet 610. Thus, the QoS switching unit 404 of the receiving apparatus 400 does not issue a request for the retransmission of the RTP packet but transmits RR 612 (error information) to the transmitting apparatus 601 to request the transmitting apparatus 601 to perform the AIR process thereby preventing the error propagation.

Upon receiving the RR 612 from the receiving apparatus 400, the transmitting apparatus 601 does not retransmit the lost RTP packet 610 to the receiving apparatus 400 but the transmitting apparatus 601 performs the AIR control to prevent the propagation of the error. This prevents the receiving apparatus 400 from having a temporal propagation of the decoding error of the moving image data due to the loss of the RTP packet 610.

Thus, when a loss of a RTP packet occurs, the receiving apparatus 400 determines whether the lost RTP packet should be retransmitted or the AIR process should be performed, and the receiving apparatus 400 informs the transmitting apparatus of the determination.

By performing the process in the above described manner, it becomes possible to prevent useless retransmission of RTP packets that cannot arrive in time for the decoding (playback), and thus it becomes possible to prevent a useless increase in communication. Thus, it is possible to use efficiently a communication band while maintaining high moving image quality. Furthermore, it is possible to prevent a useless operation of deleting a retransmitted packet whose arrival at the receiving apparatus is late for the decoding operation. When a lost RTP packet is retransmitted, the AIR process associated with the retransmitted packet is not performed. This allows a reduction in the processing load associated with the AIR process performed in the transmitting apparatus. The receiving apparatus switches QoS depending on the RTT value relative to the allowed time. This makes it possible to achieve the advantages described above regardless of the capabilities of the transmitting apparatus.

In the embodiment described above, the RTT is given by the sum of the round-trip time between the transmitting apparatus and the receiving apparatus, the transmitting-side processing time and the receiving-side processing time. In this case, the allowed time is given by the time from the detection of a loss of a RTP packet to the time at which the decoding is to be performed for this RTP packet. However, the RTT and the allowed time are not limited to the above.

For example, the RTT may be given by the sum of the round-trip time and the transmitting-side processing time. In this case, the allowed time is given by the time from the transmission of the error information to the time of the reception of the retransmitted RTP packet. In this case, the RTT acquisition unit 406 acquires the one-way travel time between the transmitting apparatus and the receiving apparatus by calculation from the transmission time and the reception time for a normal RTP packet. More specifically, in this case, the reception time is a time at which a RTP packet was correctly received without an error by the receiving apparatus as of the detection of the loss of the RTP packet, and the transmission time is a time at which this correctly received RTP packet was transmitted from the transmitting apparatus. The round-trip time is obtained by doubling the acquired one-way travel time, and the RTT value is determined by adding the previously obtained transmitting-side processing time to the round-trip time.

The QoS switching unit 404 may acquire the transmission time of error information by adding the receiving-side processing time to the detection time of the loss of the RTP packet. The receiving-side processing time may be assumed to have a fixed value stored in advance in the receiving apparatus 400. Thereafter, the allowed time is determined from the transmission time of the error information and the decoding time at which the decoding is to be performed for the last RTP packet. The RTT value is then compared with the determined allowed time. If the allowed time is greater than the RTT value, it is determined that if the lost RTP packet is retransmitted, the retransmitted RTP packet will arrive in time for the playback (decoding), and thus the retransmission request is issued to the transmitting apparatus. On the other hand, when the allowed time is smaller than the RTT, it is determined that even if the lost RTP packet is retransmitted, the retransmitted RTP packet will not arrive in time for the playback (decoding), and thus the AIR process request is issued to the transmitting apparatus.

By performing the process in the above-described manner, the advantages of the invention can also be achieved.

In the embodiments described above, the transmitting apparatus 100 has therein the moving image encoder 102 configured decode moving image data. Alternatively, the moving image encoder 102 may be disposed separately from the transmitting apparatus 100. In the embodiments described above, the receiving apparatus 400 has therein the moving image decoder 407 configured to decode moving image data. Alternatively, the moving image decoder 407 may be disposed separately from the receiving apparatus 400.

In the embodiments described above, MPEG-4 is employed as the algorithm of encoding moving image data, and RTP is employed as a data transfer protocol for transferring encoded moving image data. The algorithm of encoding moving image data is not limited to MPEG-4, but other similar encoding algorithm based on interframe prediction encoding such as MPEG2, H.264, etc., may also be employed. The data transfer protocol is not limited to RTP but other protocols in the same layer or in other layers of the OSI reference model. The protocol for transmission of error information is not limited to the RR (Receiver Report) of RTCP but other protocols such as NACK of TCP may be employed.

The embodiments described above may be realized using software in a system or a computer (or a CPU or an MPU) in an apparatus. That is, one or more functions according to any of the above-described embodiments of the invention may be implemented on a computer by installing a computer program on the computer. Thus, the computer program for realizing one or more functions according to any of the above-described embodiments of the invention also falls within the scope of the present invention. In this case, there is no particular restriction on the form of the program as long as it functions as a program. That is, the program may be realized in various forms such as an object code, a program executed by an interpreter, script data supplied to an operating system, etc.

The program for implementing one or more functions according to any of the above-described embodiments of the invention on the computer may be supplied to the computer via a storage medium or a wired/wireless communication medium. Storage media which may be employed in the present invention to supply the program code include a floppy disk, a hard disk, an optical disk, a magneto-optical disk, a CD-ROM, a CD-R, a magnetic tape, a non-volatile memory card, a ROM, and a DVD.

An example of a method of supplying the program via a wired/wireless communication medium is to use a server on a computer network. In this case, data files (program data files) of computer programs for implementing one or more functions of any embodiment of the invention are stored in the server. The program data files may be described in executable code or source code.

When a client computer on which to install a computer program access the server, a corresponding program data file is downloaded into the client computer thereby supplying the program to the client computer. Each program data file may be divided into a plurality of segment files and these segment files may be stored in different servers. Thus, the server configured to provide program data files to the client computer to implement one or more functions according to any embodiment of the invention on the computer also falls within the scope of the present invention.

The computer program according to the present invention may be stored in an encrypted form on a storage medium, the storage medium may be distributed to users. Particular authorized users are allowed to be provided with key information used to decrypt the encrypted program thereby making it possible to install the program on computers of the users. The key information may be supplied, for example, by downloading it from a Web site via the Internet.

The computer program may use one or more functions of an operating system (OS) running on the computer thereby realizing one or more functions according to any embodiment of the invention. Part or all of the computer program according to the present invention may be supplied in the form of firmware such as an extension board mounted on the computer and one or more functions according to any embodiment of the invention may be implemented using a CPU disposed on the extension board.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

What is claimed is:

1. A receiving apparatus configured to receive encoded moving image data from a transmitting apparatus, comprising:
    a decoding unit configured to decode the encoded moving image data stored in the receiving apparatus;
    a first determination unit configured to determine a decoding time at which decoding is performed for lost encoded moving image data, the decoding time depending on an amount of the encoded moving image data stored in the receiving apparatus;
    an acquiring unit configured to acquire the decoding time determined by the first determination unit when the loss of the encoded moving image data occurs;
    a second determination unit configured to determine whether retransmission of the lost encoded moving image data is in time for the decoding, and in a case where the second determination unit determines that the retransmission of the lost encoded moving image data is not in time, determine to request the transmitting apparatus to switch, for moving image data of which decoding time is later than the decoding time of the lost encoded moving image data, to intraframe encoding and transmit the encoded moving image data; and
    a transmitting unit configured to transmit the request determined by the second determination unit to the transmitting apparatus.

2. The receiving apparatus according to claim 1, wherein the second determination unit determines, based on the decoding time of the lost encoded moving image data, whether to request the transmitting apparatus to retransmit the lost encoded moving image data.

3. The receiving apparatus according to claim 1, wherein the acquiring unit acquires transmitting time information and decoding time information, the transmitting time information corresponding to a period of time between a time of transmission of moving image data from the transmitting apparatus and a time of reception of this moving image data at the receiving apparatus, and
the decoding time information corresponding to the decoding time at which decoding is to be performed for the lost encoded moving image data; and
wherein the second determination unit determines, based on the transmitting time information and the decoding time information, whether to request the transmitting apparatus to retransmit the lost encoded moving image data or to request the transmitting apparatus to switch, for moving image data of which decoding time is later than the decoding time of the lost encoded moving image data, to intraframe encoding and transmit the encoded moving image data.

4. The receiving apparatus according to claim 1,
wherein the acquiring unit acquires transmitting time information corresponding to a period of time between a time of transmission of moving image data from the transmitting apparatus and a time of reception of this moving image data at the receiving apparatus;
wherein the acquiring unit acquires a first processing time and a second processing time, the first processing time indicating a time spent by the transmitting apparatus for retransmitting the lost encoded moving image data when loss information indicating a loss of the transmitted moving image data is received, the second processing time indicating a time spent by the receiving apparatus for transmitting the loss information when the loss of the encoded moving image data is detected, and
the transmitting time information indicating the sum of the first processing time, the second processing time, and a third time, the third time corresponding to the sum of a time between a time of the transmission of data from the transmitting apparatus and a time of the reception of this data at the receiving apparatus and a time between a time of the transmission of the loss information from the receiving apparatus and a time of the reception of the loss information at the transmitting apparatus; and
wherein the second determination unit makes the determination such that if a time indicated by the transmitting time information is shorter than a time corresponding to the time difference between a detection time at which the loss of the encoded moving image data was detected by the receiving apparatus and the decoding time at which decoding is to be performed for the lost encoded moving image data, the second determination unit determines to request the transmitting apparatus to retransmit the lost encoded moving image data.

5. The receiving apparatus according to claim 1,
wherein the acquiring unit acquires time information related to a time at which decoding is to be performed for lost encoded moving image data; and
wherein the second determination unit determines whether to request the transmitting apparatus to transmit moving image data that is to be played back after the lost encoded moving image data.

6. A method for receiving encoded moving image data from a transmitting apparatus, comprising:
    decoding the encoded moving image data stored in a receiving apparatus;
    first determining a decoding time at which decoding is performed for lost encoded moving image data, the decoding time depending on an amount of the encoded moving image data stored in the receiving apparatus;
    acquiring the determined decoding time when the loss of the encoded moving image data occurs;
    second determining whether retransmission of the lost encoded moving image data is in time for the decoding; and
    in a case where the retransmission of the lost encoded moving image data is determined to not be in time, determining to request the transmitting apparatus to switch, for moving image data of which decoding time is later than the decoding time of the lost encoded moving image data, to intraframe encoding and transmit the encoded moving image data, and transmitting the determined request to the transmitting apparatus.

7. The method according to claim 6,
wherein the acquiring acquires transmitting time information and decoding time information, the transmitting time information corresponding to a period of time between a time of transmission of moving image data from the transmitting apparatus and a time of reception of this moving image data at the receiving apparatus, and the decoding time information corresponding to a decoding time at which decoding is to be performed for the lost encoded moving image data; and wherein the second determining determines, based on the transmitting time information and the decoding time information, whether to request the transmitting apparatus to retransmit the lost encoded moving image data or to request the transmitting apparatus to switch, for moving image data of which decoding time is later than the decoding time of the lost encoded moving image data, to intraframe encoding and transmit the encoded moving image data.

8. The method according to claim 6, wherein the acquiring acquires transmitting time information corresponding to a period of time between a time of transmission of moving image data from the transmitting apparatus and a time of reception of this moving image data at the receiving apparatus;

wherein the acquiring acquires a first processing time and a second processing time, the first processing time indicating a time spent by the transmitting apparatus for retransmitting the lost encoded moving image data when loss information indicating a loss of the transmitted moving image data is received, the second processing time indicating a time spent by the receiving apparatus for transmitting the loss information when the loss of the encoded moving image data is detected, and the transmitting time information indicating the sum of the first processing time, the second processing time, and a third time, the third time corresponding to the sum of a time between a time of the transmission of data from the transmitting apparatus and a time of the reception of this data at the receiving apparatus and a time between a time of the transmission of the loss information from the receiving apparatus and a time of the reception of the loss information at the transmitting apparatus; and wherein the second determining determines such that if a time indicated by the transmitting time information is shorter than a time corresponding to the time difference between a detection time at which the loss of the encoded moving image data was detected by the receiving apparatus and the decoding time at which decoding is to be performed for the lost encoded moving image data, the second determining to request the transmitting apparatus to retransmit the lost encoded moving image data.

9. A non-transitory computer-readable storage medium in which a program is stored, the program being executable by a computer to receive encoded moving image data from a transmitting apparatus, the program for causing the computer to perform operations comprising:

decoding the encoded moving image data stored in a receiving apparatus;

first determining a decoding time at which decoding is performed for lost encoded moving image data, the decoding time depending on an amount of the encoded moving image data stored in the receiving apparatus;

acquiring the determined decoding time when the loss of the encoded moving image data occurs;

second determining whether retransmission of the lost encoded moving image data is in time for the decoding; and in a case where the retransmission of the lost encoded moving image data is determined to not be in time, determining to request the transmitting apparatus to switch, for moving image data of which decoding time is later than the decoding time of the lost encoded moving image data, to intraframe encoding and transmitting the encoded moving image data, and transmitting the determined request to the transmitting apparatus.

10. The medium according to claim 9, wherein the acquiring acquires transmitting time information and decoding time information, the transmitting time information corresponding to a period of time between a time of transmission of moving image data from the transmitting apparatus and a time of reception of this moving image data at the receiving apparatus, and the decoding time information corresponding to the decoding time at which decoding is to be performed for the lost encoded moving image data; and wherein the second determining determines, based on the transmitting time information and the decoding time information, whether to request the transmitting apparatus to retransmit the lost encoded moving image data or to request the transmitting apparatus to switch, for moving image data of which decoding time is later than the decoding time of the lost encoded moving image data, to intraframe encoding and transmit the encoded moving image data.

11. The medium according to claim 9, wherein the acquiring acquires transmitting time information corresponding to a period of time between a time of transmission of moving image data from the transmitting apparatus and a time of reception of this moving image data at the receiving apparatus;

wherein the acquiring acquires a first processing time and a second processing time, the first processing time indicating a time spent by the transmitting apparatus for retransmitting the lost encoded moving image data when loss information indicating a loss of the transmitted moving image data is received, the second processing time indicating a time spent by the receiving apparatus for transmitting the loss information when the loss of the encoded moving image data is detected, and the transmitting time information indicating the sum of the first processing time, the second processing time, and a third time, the third time corresponding to the sum of a time between a time of the transmission of data from the transmitting apparatus and a time of the reception of this data at the receiving apparatus and a time between a time of the transmission of the loss information from the receiving apparatus and a time of the reception of the loss information at the transmitting apparatus; and wherein the second determining determines such that if a time indicated by the transmitting time information is shorter than a time corresponding to the time difference between a detection time at which the loss of the encoded moving image data was detected by the receiving apparatus and the decoding time at which decoding is to be performed for the lost encoded moving image data, the second determining to request the transmitting apparatus to retransmit the lost encoded moving image data.

* * * * *